(12) United States Patent
Bangalore

(10) Patent No.: US 8,219,739 B2
(45) Date of Patent: Jul. 10, 2012

(54) READ-ONLY OPTIMIZED FLASH FILE SYSTEM ARCHITECTURE

(75) Inventor: Kiran K. Bangalore, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 98 days.

(21) Appl. No.: 11/479,901

(22) Filed: Jun. 30, 2006

(65) Prior Publication Data
US 2008/0005450 A1 Jan. 3, 2008

(51) Int. Cl.
*G06F 12/00* (2006.01)
(52) U.S. Cl. ............ 711/103; 711/E12.008; 365/185.33
(58) Field of Classification Search .................. None
See application file for complete search history.

(56) References Cited

U.S. PATENT DOCUMENTS

| | | | | |
|---|---|---|---|---|
| 5,586,285 | A * | 12/1996 | Hasbun et al. | ............... 711/103 |
| 5,592,435 | A | 1/1997 | Mills et al. | |
| 5,684,752 | A | 11/1997 | Mills et al. | |
| 5,754,817 | A | 5/1998 | Wells et al. | |
| 5,802,553 | A | 9/1998 | Robinson et al. | |
| 5,937,434 | A * | 8/1999 | Hasbun et al. | ............... 711/170 |
| 6,088,759 | A | 7/2000 | Hasbun et al. | |
| 6,182,188 | B1 | 1/2001 | Hasbun et al. | |
| 6,311,290 | B1 | 10/2001 | Hasbun et al. | |
| 6,343,342 | B1 * | 1/2002 | Carlson | ............... 711/112 |
| 6,412,040 | B2 | 6/2002 | Hasbun et al. | |
| 6,490,649 | B2 * | 12/2002 | Sinclair | ............... 711/103 |
| 6,757,800 | B1 * | 6/2004 | Estakhri et al. | ............... 711/168 |
| 2004/0111555 | A1 * | 6/2004 | Gonzalez et al. | ............... 711/103 |
| 2005/0209991 | A1 * | 9/2005 | Rogers et al. | ............... 707/1 |
| 2005/0243640 | A1 | 11/2005 | Rudelic et al. | |
| 2005/0256843 | A1 * | 11/2005 | Santos et al. | ............... 707/2 |
| 2005/0265074 | A1 * | 12/2005 | Shoff et al. | ............... 365/185.08 |
| 2006/0106880 | A1 | 5/2006 | Wang et al. | |
| 2007/0157000 | A1 * | 7/2007 | Qawami et al. | ............... 711/170 |

OTHER PUBLICATIONS

Kumar, et al. "Flash Memory Directory Virtualization," U.S. Appl. No. 11/120,926, filed May 3, 2005.
Wang, et al. "File System Management for Integrated NOR and NAND Flash Memory," U.S. Appl. No. 11/266,866, filed Nov. 3, 2005.
Bangalore, K. "Reclaim Algorithm for Fast Edits in a NonVolatile File System," U.S. Appl. No. 11/361,227, filed Feb. 24, 2006.
Bangalore, et al. "Method and Apparatus to Reclaim NonVolatile Memory Space," U.S. Appl. No. 11/395,982, filed Mar. 30, 2006.
Chu, H. "Method, Apparatus and System for Reverting Fat Cluster Number to File ID and Offset of Non-Fat Flash File System," U.S. Appl. No. 11/395,124, filed Mar. 31, 2006.

* cited by examiner

*Primary Examiner* — Kevin Ellis
*Assistant Examiner* — Baboucarr Faal
(74) *Attorney, Agent, or Firm* — Christopher K. Gagne

(57) ABSTRACT

A method and apparatus is described herein for providing an optimized file system architecture. A file system is demarcated by configuration headers at the top and bottom of a volume. File headers are stored in the volume for each file, and the file headers included references to a table sector or sectors associated with the file. The table sector(s) are to store entries associated with sectors storing the file. Each entry, which corresponds to a sector of the sectors storing the file, is to store a reference to the corresponding sector and compression information associated with the sector. Based on the compression information, files may be compressed at a sector granularity and decompressed before providing the data in response to read requests.

6 Claims, 12 Drawing Sheets

READ-ONLY OPTIMIZED FLASH FILE SYSTEM ARCHITECTURE

FIELD

This invention relates to the field of information storage and, in particular, to file system architecture.

BACKGROUND

Non-volatile memories, such as flash EPROM (erasable programmable read-only memory) devices have developed into a popular source of memory in a wide range of digital applications. Flash memory devices typically allow for high memory densities, high reliability, and low power consumption. These characteristics have made flash memory very popular for low power applications, such as embedded memory circuits. Common uses of non-volatile memory include portable computers, personal digital assistant (PDA) devices, digital cameras, cellular telephones, TV boxes, routers, copy machines, and any number of other consumer products. In these devices, both program code and system data, such as configuration parameters and other code, are often stored in flash memory, because of the compact storage and relative ease of software upgradeability.

Non-volatile memories, such as flash memories are also often used in these systems to store modular and upgradeable information, such as basic input/output system (BIOS) code, so pieces of the platform may be updated without having to frequently replace components in the system. The two common types of flash memory include NOR and NAND flash memory, which refers to the types of transistors and memory array physical organization used in the device. Both types of flash memory store information in an array of transistors, which are referred to as cells. Traditionally, each cell stores 1-bit of information per cell; however, multi-bit cells are also currently used to store multiple bits per cell of a flash device.

Typically, flash devices are organized into blocks or clusters of a plurality of cells to store data. Flash memory is usually erased on a block-level. However, in some instances flash is potentially written to in smaller sizes of data, as compared to blocks, which are generally referred to as fragments. Files are typically broken into fragments and stored in different blocks, where each fragments is a logical piece of the file. The fragments are organized and accessible through a table, and are generally linked together by a table either stored in flash or in RAM. Once the data in a fragment is updated, the updated data is written to a new location in Flash and the old location is marked invalid.

When the file system is full, i.e. the file system contains both valid and invalid fragments, or when no action is being taken, reclaim or garbage collection is performed. Here, all the valid data from a block is copied into another block, such as a spare block, while the current block is deleted. Sometimes, data is kept in the file system at a block-level, which potentially creates difficulties similar to those discussed below.

As files are often broken up by fragments and stored linked though out a flash device, memory within the device is potentially inefficiently used. When data does not fill up a block of memory, the rest of the block is usually not utilized, as a fragment of data by the construct of current file systems is required to be aligned with blocks of data.

Some flash devices include file system architectures to handle (1) a read and write style architecture and (2) a read only style architecture. Most file systems fall into the first category and are setup for read/write capability. Read and write architectures potentially incur overhead when performing reads to ensure write capability to the same memory locations. For example, garbage collection, as discussed above, sets aside some amount of memory to perform memory management, which is potentially not required in a read only portion of memory. Alternatively, current read only file system architectures, which may include a read/write file system modified to be read-only, are sometimes utilized to protect data from external parties. When a read/write architecture is modified to include a read only portion, the read access limitations potentially still exist as the file system architecture is setup to also handle writes. Moreover, some current file system align data to fragments, which may be any size, such as 1024 bytes, to optimize tables used to track the location of data. Attempts to align data with different sizes to a fragment often leads to inefficient storage and access time. Furthermore, these file system architectures usually support compression at a file granularity. As a result, in certain cases a full file remains uncompressed if it is frequently accessed, even though, only a small portion of the file is being accessed. Alternatively, a whole file is sometimes uncompressed upon an access to only a portion of the file, instead of uncompressing only the portion being accessed.

BRIEF DESCRIPTION OF THE DRAWINGS

The present invention is illustrated by way of example and not intended to be limited by the figures of the accompanying drawings.

DETAILED DESCRIPTION

Figure 1:
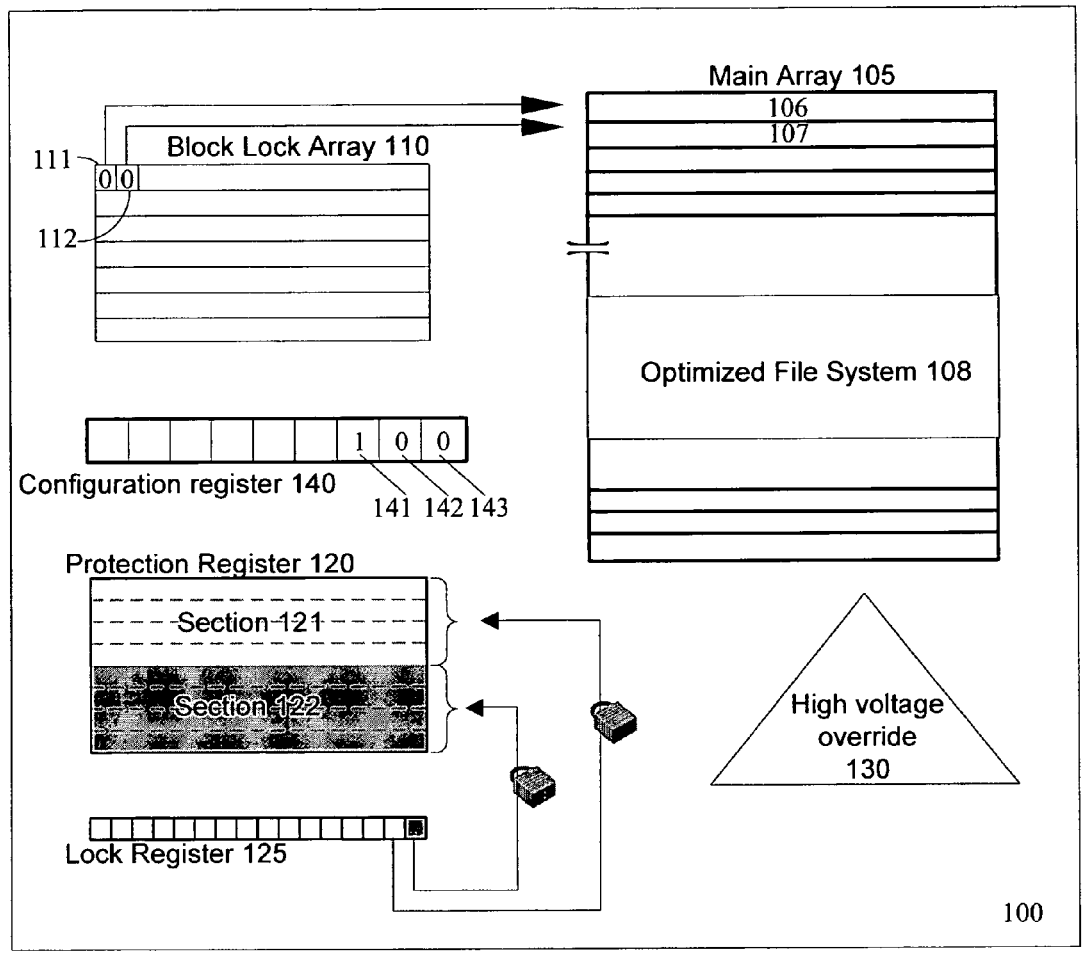
FIG. 1 illustrates an embodiment of a flash memory device including an optimized file system.

In the following description, numerous specific details are set forth such as examples of memory devices, flash organization, file system architecture layout, fields/entries within headers/tables, etc. in order to provide a thorough understanding of the present invention. It will be apparent, however, to one skilled in the art that these specific details need not be employed to practice the present invention. In other instances, well known components or methods, such as flash architecture/implementation, hashing, pointers, file directories, file hierarchies, physical address, virtual addressing etc.

have not been described in detail in order to avoid unnecessarily obscuring the present invention.

The method and apparatus described herein are for providing an optimized file system architecture. Specifically, a read optimized file system architecture is primarily discussed in reference to flash memory devices. However, the methods and apparatus for are not so limited, as they may be implemented on or in association with any system or integrated circuit device, such as a portable digital assistant (PDA), cell phone, or other electronic device, as well as with other memory devices, such as hard-drives, removable media, and embedded memory devices.

In one embodiment an optimized file system architecture is implemented in a non-volatile memory, such as non-volatile memory 100. Non-volatile memory refers to memory that is capable of retaining stored information when power is removed. A common example of non-volatile memory 100 is an erasable programmable read-only memory (EPROM). An EPROM and an electrically erasable PROM or EEPROM device is often referred to as a flash device, since the device is "flashed" or electrically erased/programmed. As stated above, the two most common types of flash memory include NAND and NOR flash, which refers to the transistors used and organization of the flash memory.

A NOR flash cell is typically set to a specified data value by starting up electrons flowing from the source to the drain and applying a large voltage placed on a control gate, which provides a strong enough electric field to accumulate the electrons on a floating gate, a process called hot-electron injection. To erase a NOR flash cell, which is commonly done by resetting a cell to a logically high voltage, i.e. a 1 or high logic value, a large voltage differential is placed between the control gate and source, which pulls electrons off the floating gate. Most modern main memory arrays, such as main array 105, in flash devices are divided into erase segments, usually called blocks, segments or clusters. Through operation of the erase procedure, a full block, segment or cluster is erased. NOR programming, however, can generally be performed one byte or word at a time. NAND flash devices work on similar principles and are also often organized in clusters, segments or blocks. The specific implementations, operation, and manufacture of NOR and NAND flash is not described herein in detail to avoid obscuring the invention, as both types of flash are extremely well-known in the art.

Often, the use of logic levels or logical values is also referred to as 1's and 0's, which simply represents binary logic states. For example, a 1 refers to a high logic level and 0 refers to a low logic level. In many older systems a high voltage level was represented by a voltage, e.g. 5V, and a low voltage level, e.g. 0V. As another specific example, a high logic level is at 1.2V and a low logic level is at 0.3V. However, a high logic/voltage level may refer to any voltage level above a threshold value, and inversely, a low logic level may refer to any voltage level below the threshold value. In addition, there may be more than two logical levels in a cell or waveform. As an example, a single waveform or storage cell may represent four different logical values at different voltage levels.

In one embodiment, non-volatile memory 100 includes main array 105, which includes semi-conductor devices to be programmed, written to, read from, and erased, as described above. Main array 105 is organized into clusters/blocks, such as blocks 106 and 107, which are to store elements, data, operands, instructions, code, logical values, and/or other information. Non-volatile memory also includes optimized file system 108. Here, file system 108 is only a portion of main array 105. In fact, as one illustrative example, portion 108 is a read only portion of main array 105 to store read only information. Other portions of main array 105 or flash 100 potentially include alternate file systems. However, main array 105 is not so limited. As an illustrative example, device 100 is a read only memory (ROM), where all of main array 105 is a read only section organized by an optimized file system architecture, such as file system 108. Read only sections, ROMs, or other read only structures/devices are often used in embedded or other computing systems by manufactures or suppliers to program data/code and protect it from later alteration.

In one embodiment, memory 100 includes other units/modules, such as block lock array 110. As stated above, a section of main array 105 potentially includes portions that are read only, which may be implemented by hardware, firmware, software, or a construct/combination thereof. As one example, block lock array 110 utilizes one-time programmable (OTP) bits to lock blocks of main array as read only. Essentially block lock array 110 is a permanent block lock array, for locking access to blocks based on values in block lock array 110. For example, a customer writes information to block 106 and 107, and then sets OTP bits 111 and 112 to a logical value, such as a logical zero, which locks blocks 106 and 107. As an example, locking is enforced by on chip flash microcode that associated bits in block lock array 110 with blocks in main array 105.

In another embodiment, block lock array 110 is an erasable block lock array, or temporary block lock array. In contrast, to a permanent block lock array, the lock bits themselves are erasable and programmable. Here, programmers are able to temporarily lock blocks of main array 105 to ensure they are only readable and are not overwritten by other operations. Either style of block lock array may be used to provide portions of main array 105 that are locked or read only. Alternatively, a register or other device, code, software, hardware, or firmware potentially provides read only sections of memory 100. As an illustrative example, a read only memory array, addressable in memory device 100's address space is present.

In the illustrative example shown, other units/features on memory 100 include configuration register 140, protection register 120, lock register 125, and high voltage override unit 130. Configuration register 140 is to store information representing a configuration of memory device 100. Bits 141, 142, and 143 correspond to different functional units or features of memory 100, and are enabled/disabled based on their values. For example, configuration register 140 is one time programmable to set a configuration of features for memory 100. Assuming bit 142 corresponds to block lock array 110, block lock array 110 is potentially disabled based on the logical value of 0 stored in bit 142. Protection register 120 and lock register 125 are for storing manufacturer or customer information, and potentially locking access to that information. High voltage override unit 130 allows for a high voltage to be applied to memory device 130 to override certain functions, such as locking of array 105 by block lock array 110.

Optimized file system architecture 108 has been discussed above in reference to usage in a non-volatile memory, such as a flash memory and/or read only memory (ROM). However, optimized file systems are potentially utilized in any memory device, including volatile memory, random access memory (RAM), long term storage, hard-drives, or other memory devices.

Figure 2:
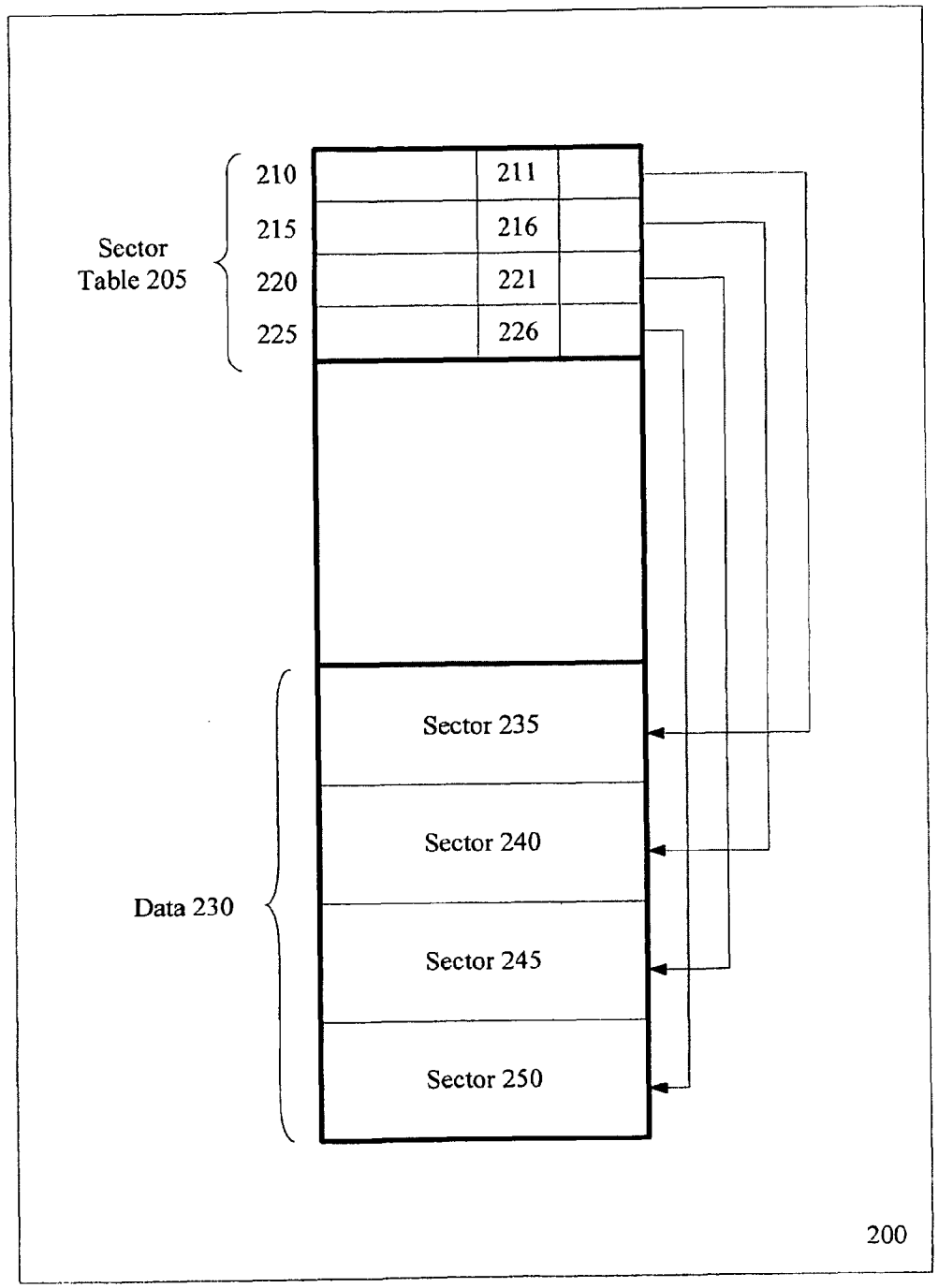
FIG. 2 illustrates an embodiment of a file system architecture including a sector table and a data sector.

Referring to FIG. 2 an embodiment of a memory device including an optimized file system architecture is illustrated. Memory device 200 includes any memory device, such as the memory devices discussed above. Information is stored in sectors 235, 240, 245, and 250 in data portion 230. In one embodiment, information in data portion 230 is a file or a portion of a file. In fact, data portion 230 is potentially a read only portion of memory device 200. In this case, a manufacturer or customer may choose to store data/code in a section of memory that is subsequently readable but not writeable. As a consequence, the file system in memory device 200 is a read only optimized file system architecture.

Alternatively, instead of only a portion of memory device 200 being read only, memory device 200 is a read only memory (ROM). Here, the ROM is initially written with files and information, and is subsequently readable by end-users. Information stored in data portion 230 is not only limited to files, as the information potentially includes any code, data, operands, values, or other information stored in memory.

In one embodiment, sectors 235, 240, 245, and 250 are arbitrarily sized delineations between portions of data or a file. For example, assuming memory device is a flash device organized into blocks; sectors 235, 240, 245, and 250 contiguously span the blocks in the flash device and each sector has a size as specified by a field in the file system architecture. Contiguous spanning of blocks in a memory device is discussed in more detail in reference to FIG. 8, while an example of specifying a size of sectors is discussed in reference to an embodiment of a configuration header shown in FIG. 5.

FIG. 2 also illustrates sector table 205 to store entries 210, 215, 220, and 225. Assuming that data 230 includes at least a portion of a file, then sector table 205's entries 210, 215, 220, and 225 are to store references 211, 216, 221, and 226 to sectors 235, 240, 245, and 250, respectively. As a result, a data file stored in the optimized file system architecture of memory device 200 is accessible on a sector granularity. As stated above, the actual granularity of sectors is arbitrary and potentially varies between implementations.

In one embodiment, reference 211 is an offset to sector 235. As an example, an offset includes an offset from a base address in memory device 200. In the case where the base address is a starting address of memory device 200, then the offset is referred to as an absolute offset. Alternatively, where the base address is another address within memory device 200, the offset is referred to as a relative offset. For example, if the base address is a starting address of sector 235, then reference 221 to sector 245 is a relative offset from sector 235 to sector 245. An offset may be represented in any number of ways. For example, an offset is a represented as a hexadecimal value to be added to the base address to obtain the referenced address. Reference fields 211, 216, 221, and 226 are not limited to offsets. For example, reference fields 211, 216, 221, and 226 potentially include a physical address, a linear address, a virtual address, or other known values that reference a memory location.

Previously, file systems stored data on a fragment or block granularity. Additionally, many of the file systems only supported compression of an entire file. However, as the optimized file system in memory 200 is addressable on a per sector granularity, compression is also potentially accomplished on a per sector basis. In one embodiment, sector table 205 is to store compression information. Here, an entry, such as entry 210, stores compression information associated with a sector, such as sector 235. As an illustrative example, if sector 235 is compressed, then entry 210 stores a first logical value to represent that sector 235 is compressed. Upon accessing, reading, or retrieving sector 235, the file system architecture is able to determine that sector 235 is compressed and is to be uncompressed before being provided in response to the access, read, or retrieval based on entry 210. Alternatively, if sector 235 is uncompressed, then a field in entry 210 represents that sector 235 is not compressed.

In one embodiment, where the file system architecture is a read only file system, sector table 205 and data section 230 are updated all at once, instead of written to on a sector or block basis. For example, assume that a read only file used for system boot is stored on memory device 200 utilizing a read only optimized file system architecture. Sectors 235, 240, 245, and 250 are readable on a per sector basis. However, when an update to the file is needed, such as an update of data in a portion of sector 240, the whole volume, i.e. sector table 205 and data portion 230, is re-written with the newly revised data in sector 240. Furthermore, after studying access patterns, it may be determined the compression state of a sector should be changed. Here, when an entire volume is re-written, an entry corresponding to a sector that has its compression state changed is also updated to reflect the change in compression of its corresponding sector.

Figure 3A:
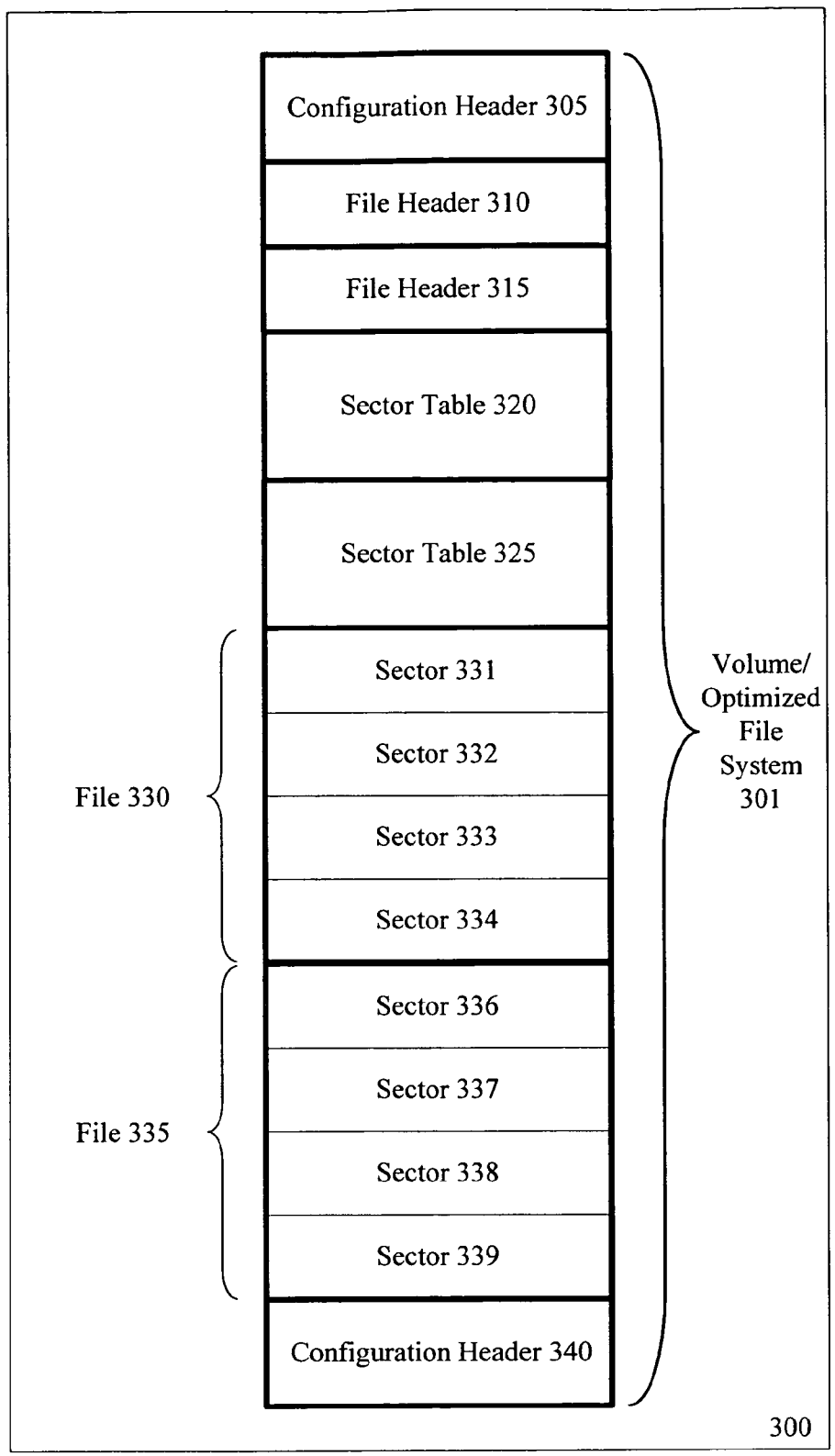
FIG. 3a illustrates another embodiment of a file system architecture.

Turning to FIG. 3a, another embodiment of an optimized file system architecture is illustrated. Memory device 300 is a nonvolatile memory, such as a flash device or read only memory (ROM). Volume 301 is demarcated by configuration headers 305 and 340. In one embodiment, configuration headers 305 and 340 are to store validation values to ensure the information in volume 301 is correctly stored. For example, configuration headers 305 and 340 include cyclic redundancy check (CRC) values. CRC values are typically generated by a type of hash function to produce a checksum value based on a grouping of data, such as volume 301 or a portion of volume 301. In an embodiment, where volume 301 is a portion of a memory array in nonvolatile memory 300, configuration headers 305 and 340 are also used to demarcate and identify the section of the array including the read only optimized file system architecture. Note that multiple portions of nonvolatile memory 300 may include multiple file system architectures that include a combination of read only optimized file systems and other file systems. Specific examples of configuration headers 305 and 340 are discussed in reference to FIG. 5.

As mentioned above, nonvolatile memory 300 potentially includes multiple file systems and multiple files within each file system. When storing multiple files in optimized file structure 301, fields such as configuration headers, file headers, sector tables, and data sectors may be organized in any fashion. FIG. 3a illustrates an embodiment where fields in file system 301 are grouped together.

As illustrated, volume 301 is to store two files, file 330 and file 335. Although any number of files or groupings of data may be stored in volume 301. File header 310 and file header 315 are grouped and stored in consecutive entries. File header 310 is to store a reference to sector table 320. In one embodiment, the reference to sector table 320 is an offset from a base address in nonvolatile memory 300. As an example, the base address is a starting/base address of nonvolatile memory 300 and the offset is an absolute offset from the starting/base address. In another example, the base address is a starting address of volume 301 or a starting address of file header 310, and the offset is a relative offset from either starting address.

Similarly, file header 315 is to store a reference to sector table 325. FIG. 3a illustrates one file header, file header 310, and one sector table, sector table 320, for file 330 to demonstrate operation of a simplified embodiment of an optimized file system. However, each file potentially includes multiple file headers. Furthermore, each file header may reference multiple sector tables for a single file. Other fields and values to be stored in a file header are discussed in more detail in reference to FIG. 6.

Sector table 320 is to store references to sectors 331-334. In one embodiment, sector table 320 includes an entry that corresponds to each sector of sectors 331-334. As an example, an entry corresponding to sector 331 includes an offset to sector 331. The entry is also to store compression information associated with sector 331. For example, if sector 331 is compressed, the entry in sector table 320 corresponding to sector 331 stores a first logical value. However, if sector 331 is uncompressed, the entry stores a second logical value. As a result, a file is capable of being compressed on a sector basis. Furthermore, when accessing a sector, whether the sector being accessed is compressed is determined from an associated sector table entry. As discussed below, in an embodiment where nonvolatile memory 300 is organized into blocks, sectors 331-339 and potentially all of volume 301 are stored unaligned with the blocks. As a result, volume 301 is stored more efficiently, utilizing contiguous memory space rather than splitting data among blocks.

Figure 3B:
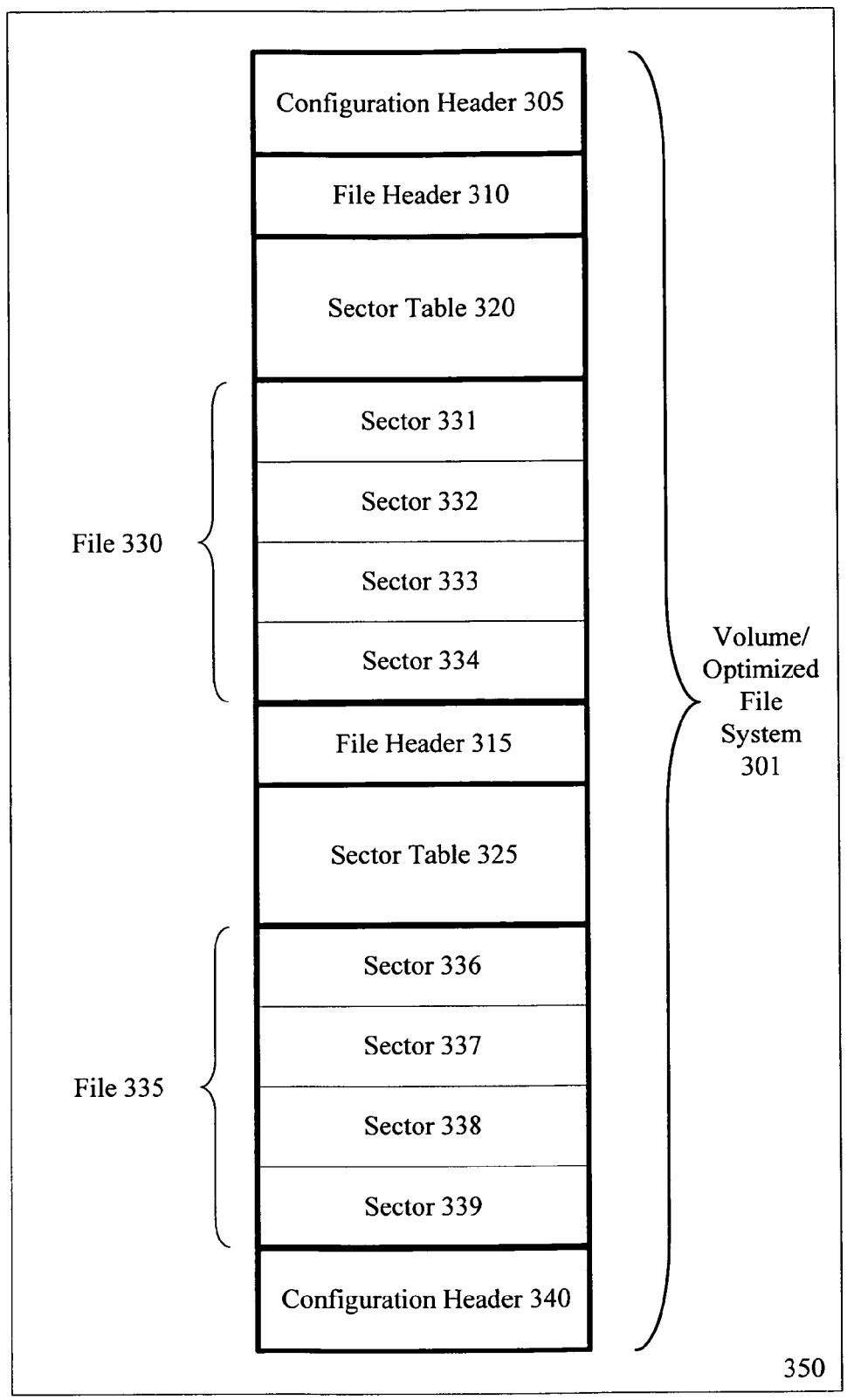
FIG. 3b illustrates another embodiment of a file system architecture.

Referring next to FIG. 3b, another embodiment of organizing an optimized file system architecture is illustrated. Here, instead of grouping similar fields within volume 301, fields are grouped based on their association to a file. File header 310 includes references to sector tables, such as sector table 320, which correspond to sectors storing information in file 330. Sector table 320 includes references to sectors 331-334 in file 330. File header 310, sector table 320, and sectors 331-334 are consecutively stored. Similarly, file header 315, sector table 325, and sectors 336-339 are associated with field 335 and consecutively stored.

Figure 4:
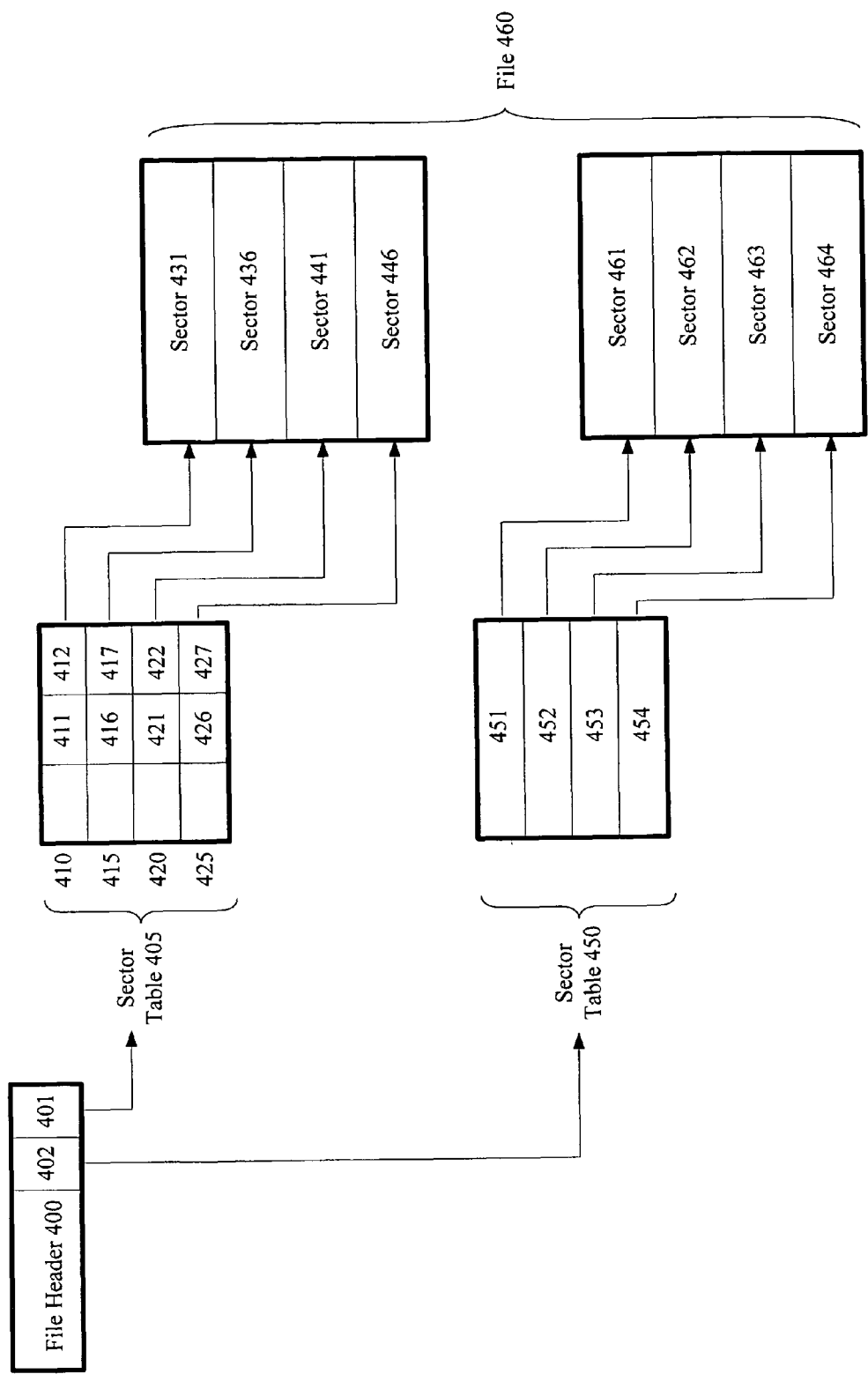
FIG. 4 illustrates an embodiment of a hierarchal logical view of a file system architecture.

Turning next to FIG. 4, an embodiment of a logical hierarchical view of an optimized file structure is illustrated. File header 400 is to store references to sector tables associated with file 460. Here, reference 401 is to point to sector table 405 and reference 402 is to point to sector table 450. Sector tables 405 and 450 are to store entries that correspond to sectors in file 460. For example, sector table 405 includes entries 410, 415, 420, and 425, which correspond with sectors 431, 436, 441, and 446, respectively. Similarly, entries 451-454 correspond to sectors 461-464.

As an illustrative example of an entry, entry 410 stores reference 412 to corresponding sector 431 and compression information 411. In one embodiment, reference 412 is an absolute offset value from the beginning of a memory device. As a simplified illustration, a base address is represented by hexadecimal value 0x00000000 and an offset value stored in field 412 is 0x0000000A, which is the address of sector 431. Addresses and offsets may represent physical, linear, physical, or other addresses, as well as being represented by hash values, hexadecimal values, binary values, or other values that represent an address or location. In another embodiment, reference 412 is an offset from a base address in the file system. Examples of potential base addresses in the file system include an address of a configuration header, file header 400, and sector table 405. Other examples of reference 412 include a physical address of sector 431, a virtual address of sector 431, or other value referencing sector 431.

In addition to reference 412, entry 410 is to store compression information associated with sector 431. Here, when sector 431 is uncompressed, field 411 stores a first value, such as a logical one. When accessing sector 431, the information stored in sector 431 is directly provided in response to the access, as field 411 represents the information is uncompressed. However, if sector 431 is compressed, field 411 stores a second value, such as a logical zero, to represent that sector 431 is compressed. Based on the second value in field 411, sector 431 is uncompressed before providing its contents to a buffer in response to the access.

Sectors 431, 436, 441, and 446, as well as sector 461, 462, 463, and 464 are part of file 460. In one embodiment, where the file system including file 460 is stored in a flash memory organized in blocks, the file system is potentially stored unaligned with blocks of the flash memory. Essentially, the data in the file system is stored in a contiguous manner disregarding the boundaries of the blocks. As a result, if the sectors of the file system are smaller than the blocks of the flash memory, then at least portions of more than one sector are stored in a block and potentially overlap other blocks. In another embodiment, file header 400, sector table 405, and sector table 450 are stored in blocks of a memory, while data sectors 431, 436, 441, 446, 461, 462, 463, and 464 are stored unaligned with blocks of the memory.

Figure 5:
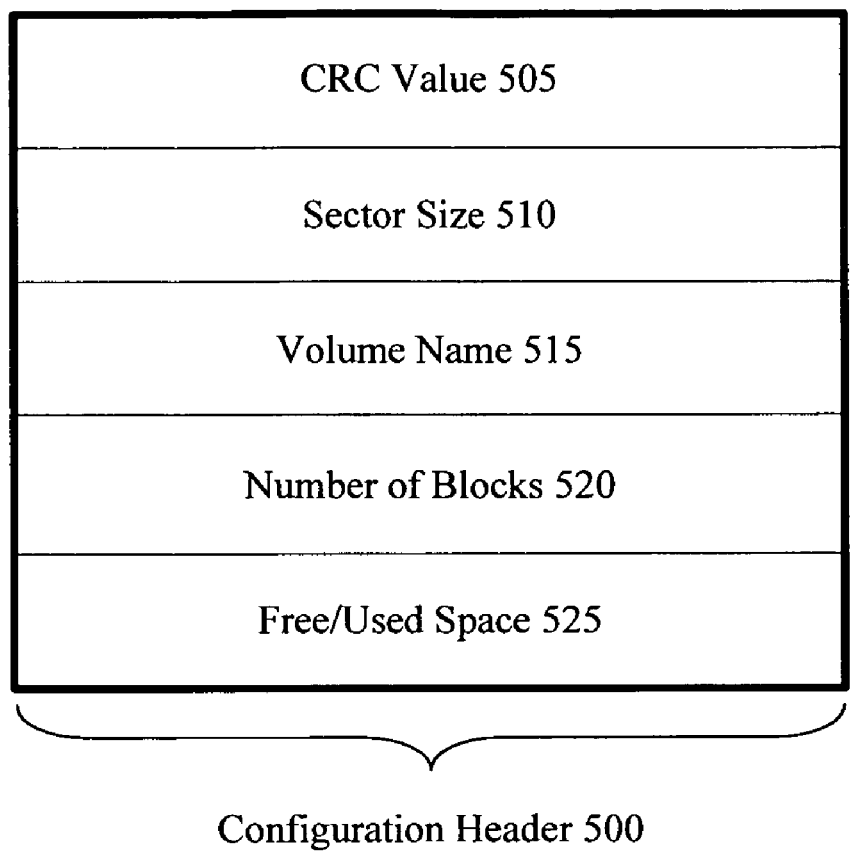
FIG. 5 illustrates an embodiment of a configuration header.
Figure 6:
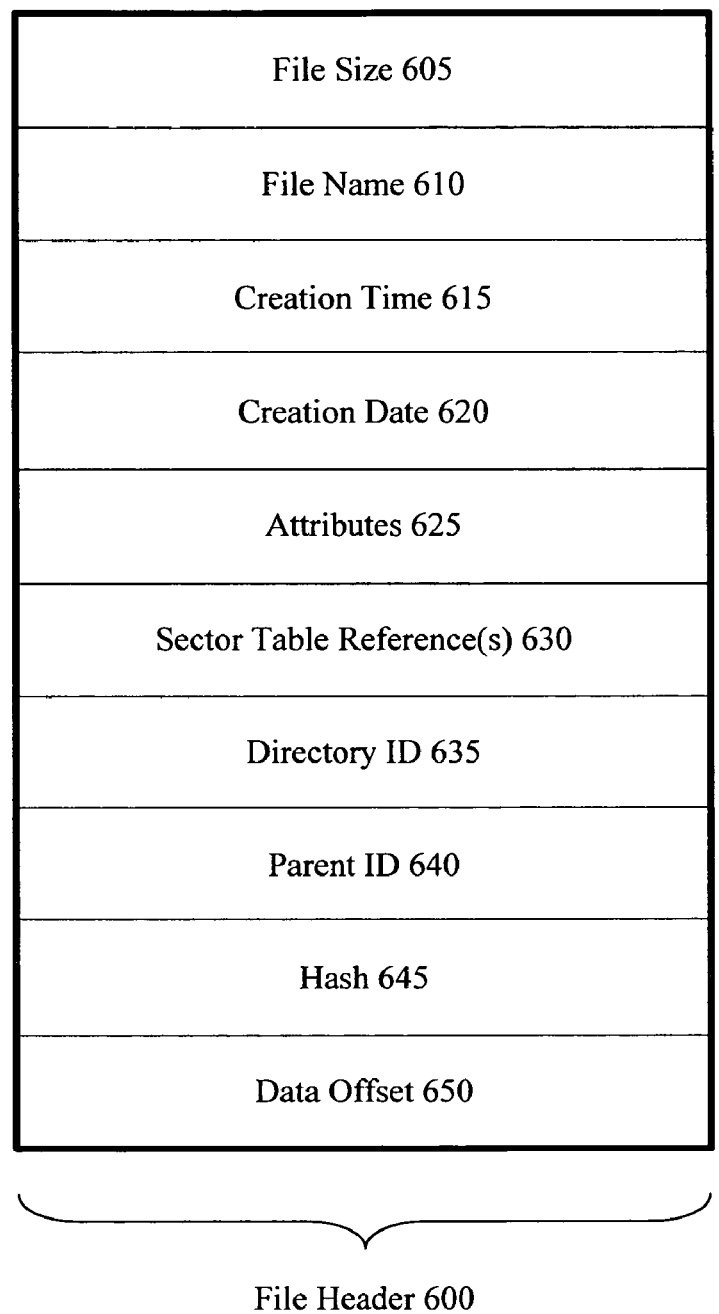
FIG. 6 illustrates an embodiment of a file header.
Figure 7:
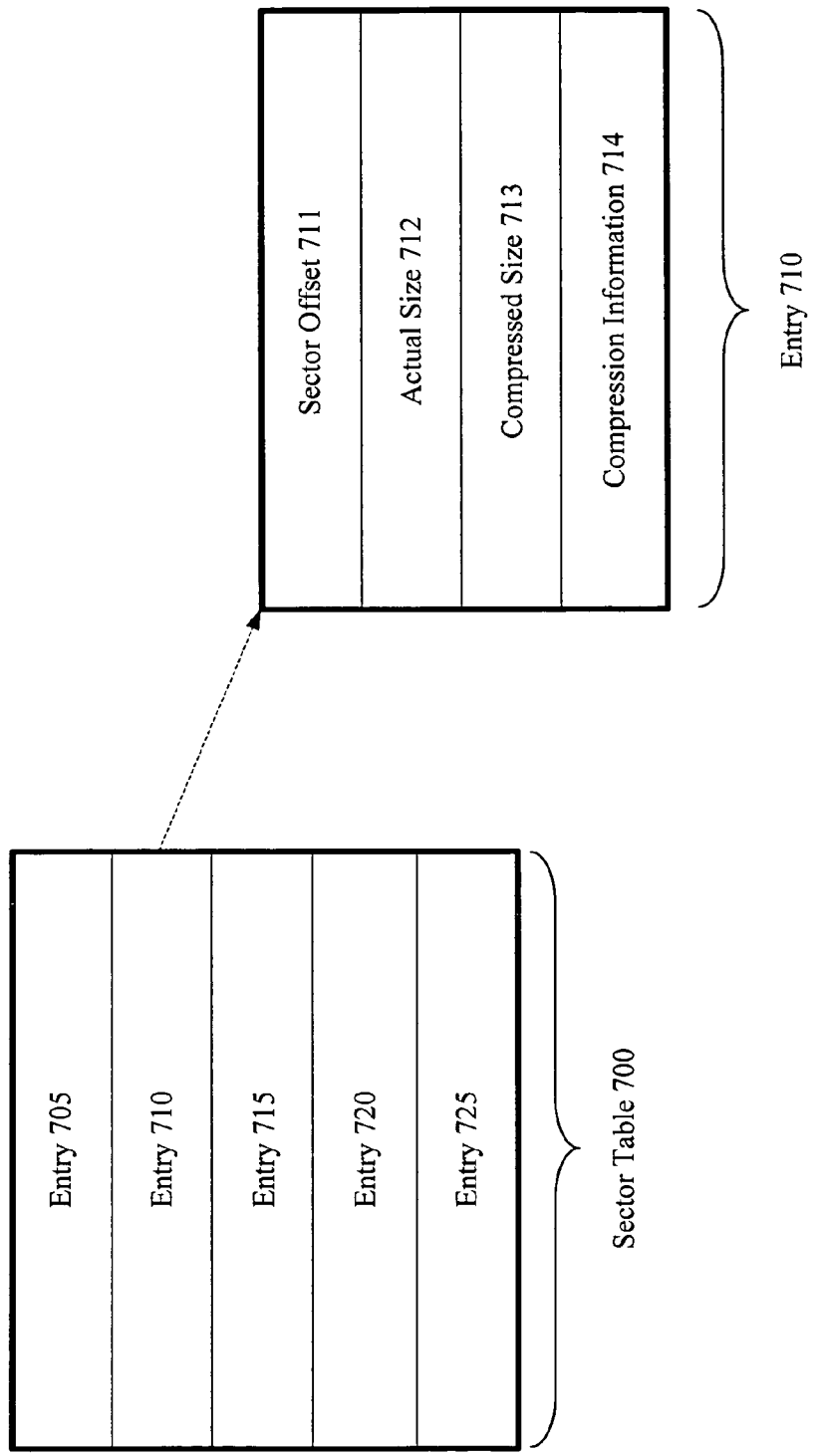
FIG. 7 illustrates an embodiment of a sector table and an entry in the sector table.

In FIGS. 5-7 embodiments of fields, headers, and entries in an optimized file system architecture are illustrated. All of the embodiments illustrate multiple fields/values capable of being utilized in an optimized file system architecture. However, the fields illustrated need not be included. In addition, other fields not illustrated may be included.

Referring to FIG. 5 an embodiment of configuration header is illustrated. Configuration header 500 includes fields/entries, such as cyclic redundancy check (CRC) value 505, sector size 510, volume name 515, number of blocks 520, and free space 525. In one embodiment, CRC value 505 is a checksum value to validate the contents of a file system or volume. For example, CRC value 505 is a hash value generated based on the information stored in the file system. In addition, configuration header 500 is stored at the beginning of a file system and at the end of the file system. Here, CRC value 505 is stored twice and checked to ensure the entire volume was written/stored correctly. Moreover, by storing configuration header 500 at both ends of a file system, the configuration header is potentially used to demarcate the file system. Consequently, a computer system is able to recognize the presence and boundaries of the optimized file system by locating the configuration headers.

Sector size field 510 is to store the size of sectors in a file system. As stated above, sectors are stored unaligned with blocks. Therefore, the size of sectors are configurable to any arbitrary size, as designated by the implementation. However, the size of sectors is stored in sector size field 510 to enable a system to interpret the file system. For example, being able to determine the sector size from sector size field 510 potentially aides compression algorithms.

Other details about the file system/volume are included in configuration header 500, such as a name of the volume stored in volume name field 515, a number of blocks that the volume is stored across in the memory device stored in number of blocks field 520, and an amount of free space stored in free space field 525. Note that from the free space field, an amount of used space may be determined by subtracting the free space from the size of the volume. Alternatively, an amount of used space is stored in field 525, and free space is determined by subtracting the used space from the size of the volume.

In FIG. 6 an embodiment of a file header is illustrated. File header 600 is to store information about a file within a file system. For multiple files in a file system, there are potentially multiple file headers. File header 600 is to store sector table reference(s) 630 to a sector table or multiple sector tables, which in turn store references to sectors storing information of a file associated with file header 600. In one embodiment, a file includes multiple sector table references 630. Here, as in FIG. 4, data of a file is split among a number of sectors and those sectors are split among multiple sector tables. As stated above, references, such as sector table reference(s) 630, may include offsets, addresses, or other references to memory locations.

Other fields that may be included in file header 600 include hash field 645 and data offset 650. As an example, hash field 645 is read at initialization to aide in finding files, such as indexing files through a file header by a hash value stored in hash field 645. In addition to having offsets to data stored in sector tables, data offsets may also be stored in field 650.

Often files are also part of a directory or hierarchical structure. Consequently, field header 600 stores identifiers, such as directory ID 635 and parent ID 640, to identify where in a directory structure a file should be placed and what files come above/below the file in the directory structure. Other examples of fields to store details about the file include field 605 to store a size value of the file, field 610 to store a file name, field 615 to store a creation time of the file, field 620 to store a creation date of the file, and field 625 to store other attributes of a file.

Turning next to FIG. 7, an embodiment of a sector table is illustrated. Sector table 700 includes entries corresponding to sectors, which are to store information/data of a file. As shown, sector table 700 includes entry 705, 710, 715, 720, and 725 to correspond to sectors, not illustrated. An embodiment of entry 710 is illustrated on the right. Here, the reference to the sector corresponding to entry 710 is an offset stored in sector offset field 711. In one embodiment, the offset is a relative offset from a base address in sector table 700 or the beginning of a data section. In another embodiment, sector offset 711 stores an absolute offset from the beginning of a memory device.

Entry 710 is also to store compression information 714 associated with the corresponding sector. Compression information includes any representation of compression or formatting of the corresponding sector. As a simplified illustrative example, compression information 714 includes one bit. If the bit has a first logical state, such as a logical one, the compression information 714 represents a corresponding sector is not compressed. Upon compressing the corresponding sector or storing the volume with a corresponding compressed sector, compression information 714 stores a second logical state, such as a logical zero, to represent the corresponding sector is compressed.

Based on compression information fields in entries 705, 710, 715, 720, and 725, sectors of a file may be individually compressed and furthermore, accessible by a system capable of determining a compression state of a sector based on the associated compression information fields. Other information of relating to a sector, such as sector size is stored in field 712 and a compressed size is stored in field 713.

Figure 8:
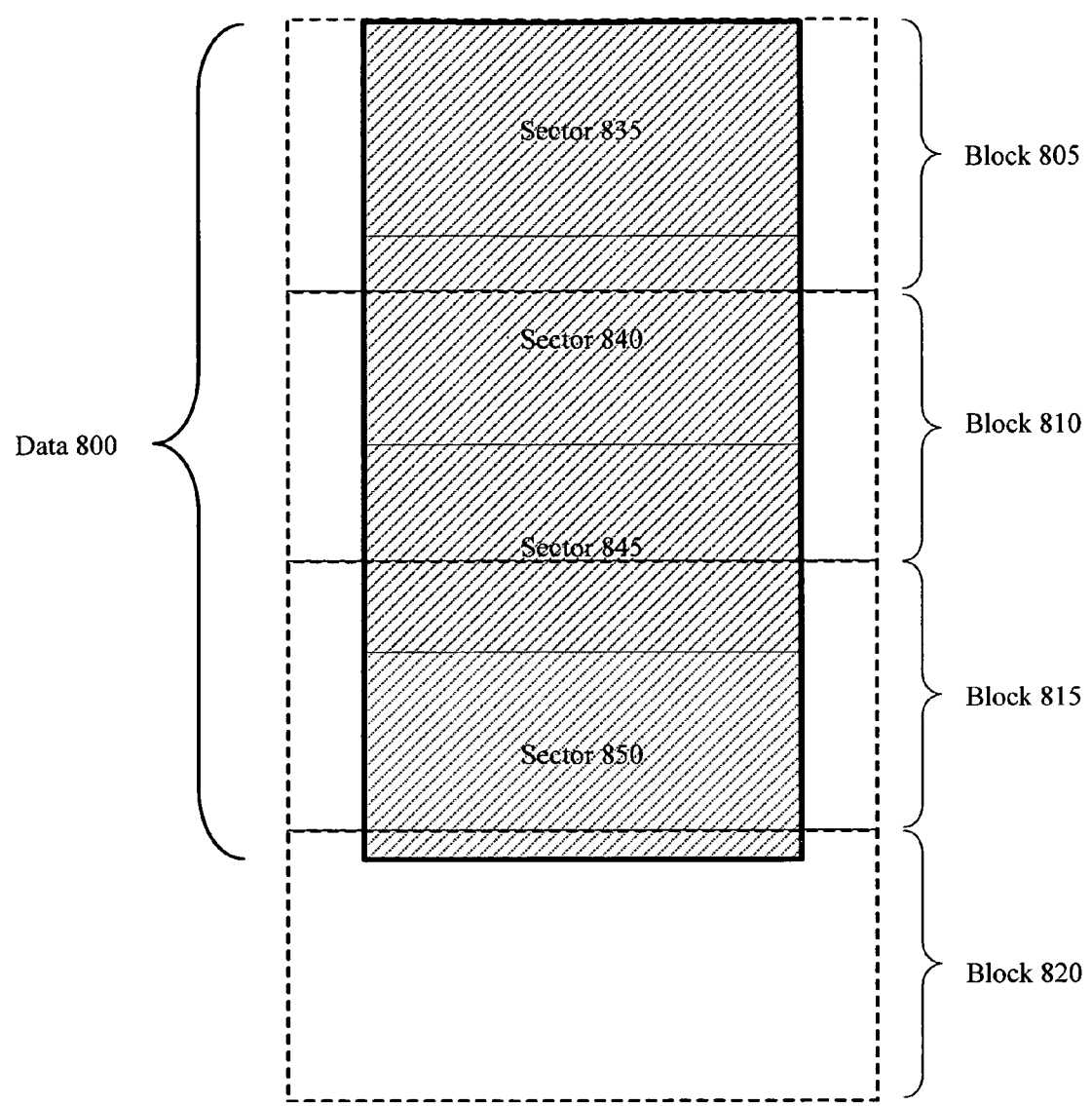
FIG. 8 illustrates an embodiment of sectors unaligned with blocks of a memory device.

Referring to FIG. 8, an embodiment of sectors unaligned with blocks of a memory is illustrated. Often in a nonvolatile memory, such as a flash device, the memory device is organized into blocks. Writes to a nonvolatile memory are typically on a block or word basis, while information is usually erased in blocks. However, as illustrated, sectors 835, 840, 845, and 850 contiguously span blocks 805, 810, 815, and 820 in data section 800.

Previously, information broken into sectors 835 and 840 would be split among blocks 805 and 810, so that they are aligned with the blocks and are accessible in blocks. Here, the space between the ending of sector 835 and the beginning of block 805 is potentially wasted, just to ensure alignment of data with blocks for later erasure and writing. By essentially disregarding the boundaries of blocks 805, 810, 815, and 820 and storing sectors 835, 840, 845, and 850 unaligned with those blocks, space is more efficiently utilized. In an embodiment where sectors 835, 840, 845, and 850 are part of a read only optimized file system architecture, sectors 835-850 are potentially all updated at once, instead of individually, which allows sectors to be contiguous and efficiently stored.

As illustrated, sectors 835, 840, 845, and 850 are smaller in size than blocks 805-820. As a result, more sectors are present in each block, such as a portion of two sectors in one block. However, sector sizing is not so limited. In an embodiment, where sector size is set in a configuration header or file header, sectors are sized in any manner, including being smaller so any number of sectors span a single block, or larger so that a sector spans multiple blocks.

Figure 9:
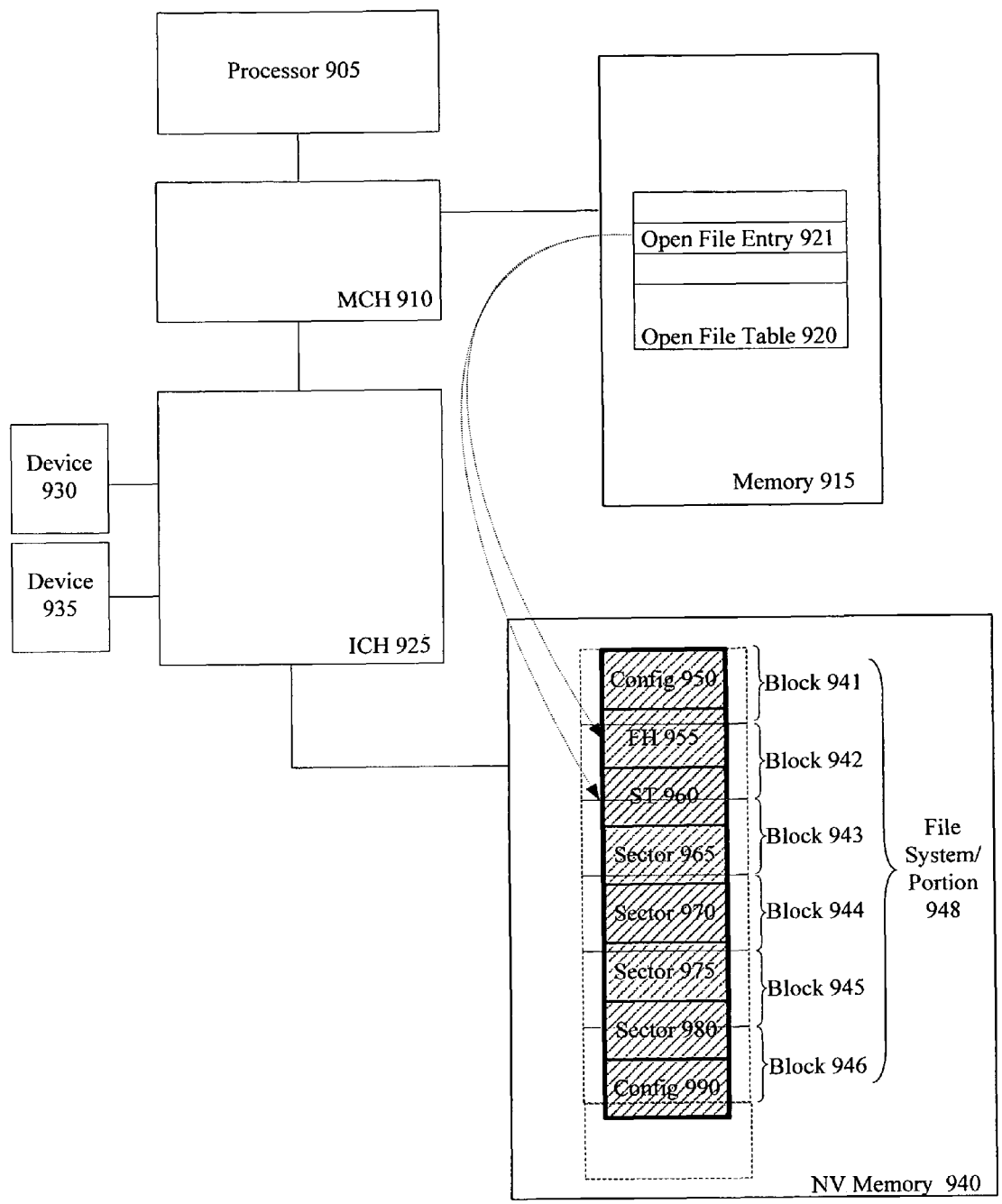
FIG. 9 illustrates an embodiment of a system including an optimized file system architecture and an open file table.

In reference to FIG. 9, an embodiment of a system including an optimized file system architecture is illustrated. Processor 905 is a host microprocessor or other processing device coupled to a memory controller hub 910 for accessing memory 915. System memory 915 includes any common system memory, such as random access memory (RAM), double data rate (DDR) ram, or other system memory. Interconnect controller hub 925 couples MCH 910 to I/O devices, such as devices 930 and 935, as well as other system components, such as nonvolatile memory 940.

In one embodiment nonvolatile memory 940 is a flash memory, such as a NOR or NAND flash device. As an example, NV memory 940 is to store basic input/output system (BIOS) code. Other code, such as extensible firmware interface (EFI) extensions/code, may also be stored in nonvolatile memory 940. In addition, the main array of NV memory 940 includes read only portion 948, which includes a read only optimized file system architecture.

Here, read only file system architecture 948 includes configuration headers 950 and 990 to demarcate the file system architecture within the main array of nonvolatile memory 940. As a result, NV memory 940 is able to delineate between other read/write accessible portions of the main array from portion 948, which is an optimized read only portion. To simplify the illustration, only one file is stored in portion 948 with its data stored among sectors 965-980. Additionally, there is only a single sector table, sector table 960, to store references to each of sectors 965-980. Furthermore, sector table 960 is to store compression information in each entry corresponding to a sector of sectors 965-980. Finally, file header 955 is illustrated, which is associated with the file and is to store a reference to sector table 960. However, as discussed above, there may be any number of files and corresponding file headers in portion 948, as well as any number of sector tables per file to point to sectors with data.

In another embodiment, NV memory 940 is a read only memory (ROM), where the entire main array of ROM 940 includes optimized read only files system architecture 948. Yet, the entire main array of ROM 940 is not required to implement an optimized file system architecture. In fact, similar to the flash memory embodiment discussed above, any portion of a main array in ROM 940 potentially includes an optimized read only file system.

In one embodiment, memory 915 is to store open file table 920. When accessing a file, it is potentially advantageous to have an open file table 920 to expedite accesses to files stored in NV memory 940. For example, open file table 920 includes open file entry 921 to store a location of a file header, such as file header 955. Here, when the file in NV memory 940 is accessed, an address, offset, hash value, or other reference to file header 955 is stored in open file entry 921. Therefore, upon subsequent access to the file in NV memory 940, file header 955 may be directly accessed, instead of locating configuration header 950 and/or searching through an index of file header hash values for a matching hash value to find file header 955. In another embodiment, open file entry 921 may also store a current reference, location, or offset. As an example, if a portion of the file being accessed is stored in sector 970, then a current offset value referencing sector table 960 or directly referencing sector 970 may also be stored in open file entry 921 to allow for direct and quicker access to sector 970.

Open file tables and virtualizing of memory directories are discussed in a co-pending application entitled, "Flash Memory Directory Virtualization," with application Ser. No. 11/120,926.

Figure 10:
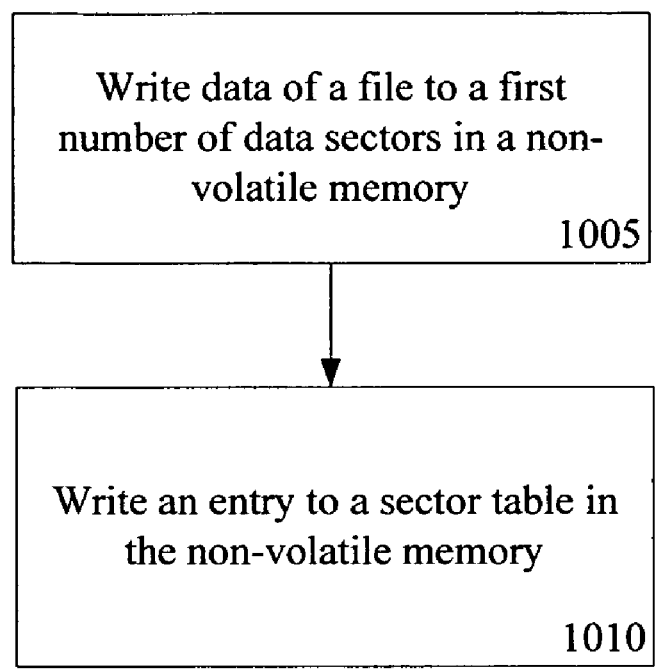
FIG. 10 illustrates an embodiment of a flow diagram of a method for writing data to sectors across blocks and writing an entry in a sector table.

Turning to FIG. 10 an embodiment of flow diagram for a method of writing to an optimized file system architecture is illustrated. In flow 1005, data of a file is written to a first number of data sectors in a non-volatile memory. In one embodiment, the data sectors are stored unaligned with blocks of the non-volatile memory. Sectors are stored contiguously to efficiently utilize space of the nonvolatile memory. Additionally, the sectors span blocks of the nonvolatile memory. As an illustration, when sectors are smaller in size than the blocks, at least a portion of more than one sector resides in a block. Alternatively, when a sector size is greater than a block, then one sector crosses the boundaries of one block into another block. Examples of non-volatile memory include NOR flash, NAND flash, and read only memory (ROM).

In flow 1010, an entry is written in a sector table in the non-volatile memory. The entry in the sector table is to correspond to a sector of the first number of data sectors. Here, the entry is to store a reference to the corresponding sector, as well as compression information associated with the corresponding sector. As stated above, compression information includes any representation of a compression state of the corresponding sector, such as logical values to represent whether or not the corresponding sector is compressed.

In one embodiment, the data sectors and the sector table are part of a read only file system architecture. Additionally, a volume having the file system architecture includes a file header, the sector table, and the data sectors. In this example, as the file system architecture is read only, the volume is updated through a clean write of the volume to memory. Therefore, if an update or write is to be completed, the whole volume is updated. Therefore, it is predetermined if the corresponding sector is to be compressed, as well as what values the entry in the sector table is to include. As a result, in writing the whole volume, the entry in the sector table is potentially written to memory before the data is written to the first number of data sectors.

Figure 11:
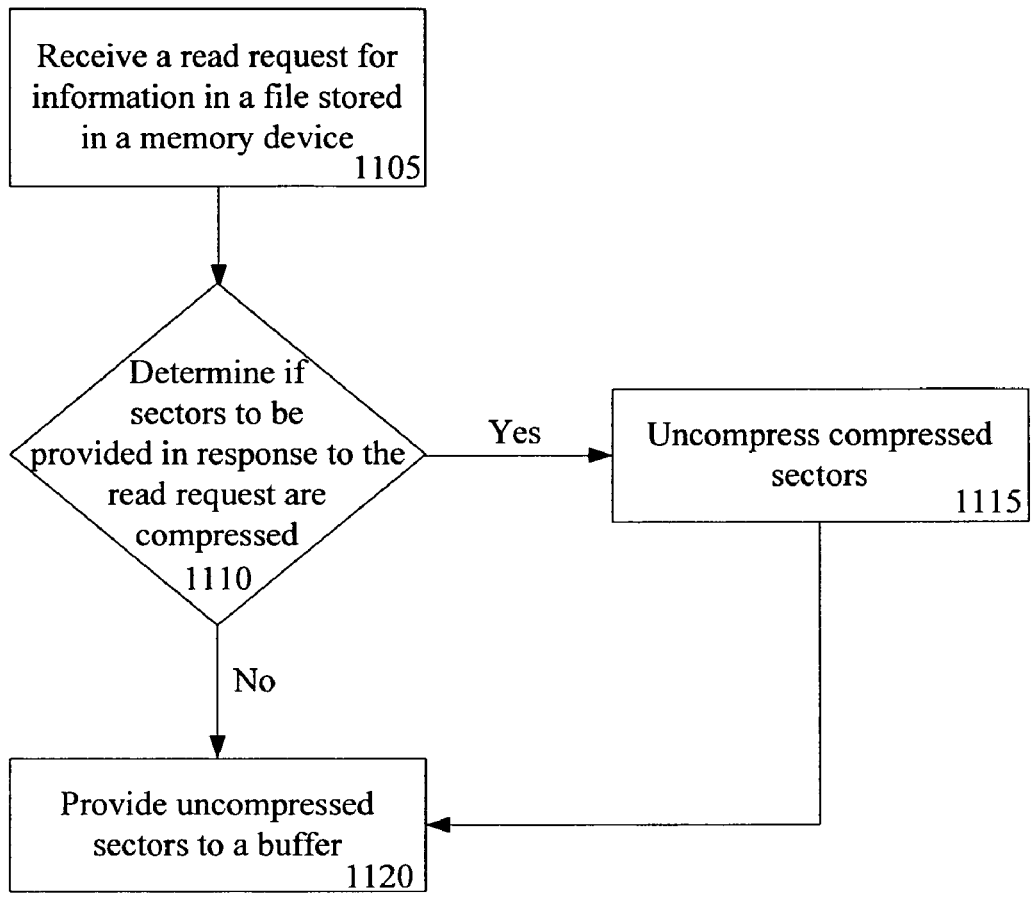
FIG. 11 illustrates an embodiment of a flow diagram of a method for providing sectors to a buffer in response to a read request.

In turning to FIG. 11, an embodiment of reading from an optimized file system architecture is illustrated. In flow 1105, a read request for information in a file stored in a memory device is received. Often a read request is generated by an external device; however, any read request referencing a location or file in the memory device may be received. In one embodiment, the read request references a range of locations or a section of a file to be accessed.

Next, in response to the read request the proper locations/sectors in memory to be accessed are determined. In one embodiment, the proper file is located by searching file headers for a matching hash value referenced by the read request. From the file header, the proper sector table or tables are determined, and the sectors to be provided in response to the read request are targeted. Alternatively, if an open file table is used, the file header potentially is already stored and referenced by the read request based on an entry in the open file table. In fact, a specific sector or range of sectors may also be referenced based on a current offset stored in the open file table.

Once a sector or number of sectors are determined to be provided in response to the read request, then it is determined if the sector(s) to be provided in response to the read request are compressed in flow 1110. For each sector to be provided a sector table entry associated with the sector to be provided is checked. More specifically, compression information in a sector table entry corresponding to a sector to be provided is checked. If the compression information represents that the sector is uncompressed, then it is provided in response to the read request in flow 1120. In one embodiment, a buffer, such as a read buffer, is to store sectors of provided data until the full data to be provided is collected.

However, if the compression information represents that the sector is compressed, then the sector is uncompressed and then provided to the buffer in flow 1120. After the full amount of data is collected in a buffer, such as a read buffer, then the uncompressed data may be provided to the requestor in response to the read request.

Other methods not specifically illustrated may also be performed in regards to an optimized file system architecture. For example, in a mount operation of a read only file system volume, cyclic redundancy check values are generated and checked at the top and bottom of the volume to ensure parity and/or proper storage of the volume's contents. As another example, upon accessing a file, an entry in an open file table is written including a reference to the file header and/or current offset.

Furthermore, special operations due to different operating systems or architectures may also be completed. For example, in an execute in place (XIP) architecture, where instructions are executed substantially linearly through memory to avoid complex memory addressing and inefficient boot procedures, reads are potentially performed based on linear offsets. As a result, sectors are linearly accessed and uncompressed, if they are compressed as represented by corresponding sector table entries. In other systems, an Mmap operation directly maps locations in memory. Here, offsets of data sectors may be provided to support direct memory mapping.

The embodiments of methods, software, firmware or code set forth above may be implemented via instructions or code stored on a machine-accessible or machine readable medium which are executable by a processing element. A machine-accessible/readable medium includes any mechanism that provides (i.e., stores) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices.

As illustrated above, previous file system architectures adhere to block structure of memory devices such as non-volatile memory, which potentially leads to inefficient disk usage. Examples of this disk usage include, separating data to maintain block integrity wasting potential block storage space, requiring extra blocks for operation such as reclamation, and providing special functionality for write operations. However, in an optimized read only file system architecture, a volume is potentially stored unaligned with blocks of a nonvolatile memory, allowing for efficient usage of disk space. Furthermore, instead of compressing on a per file basis, sector tables store compression information to enable compression on a sector granularity. Consequently, accesses to portions of files may be studied or tracked, and sectors of files that are not accessed often may be compressed. In addition, instead of compressing a block of data, leaving the rest of the block empty and unutilized, a whole read only file system volume is written at once to utilize disk space efficiently.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A non-transitory machine accessible medium including program code that when executed by a machine, results in the machine performing operations comprising:
   in response to a request to update a data sector with data from a file, updating an entire volume associated with the file, the volume being comprised in a memory array that also includes at least one other portion that is outside the volume, wherein the updating the entire volume comprises:
   updating:
      a data sector including the data from the file;
      an uncompressed entry in a sector table, including a reference to the data sector and a compression field holding a first value in response to the data held in the data sector being compressed, and a second value in response to the data held in the data sector being uncompressed; and
      a file header including a reference to the sector table; and
   updating a configuration header that is copied at both a beginning and an end of the volume to demarcate the volume from the at least one other portion of the memory array, the configuration header that is copied at both the beginning and the end of the volume permitting the presence and boundaries of the volume to be recognized by locating the configuration header that is copied at both the beginning and the end of the volume, the configuration header also permitting validation that information in the volume has been stored correctly, the configuration header including a cyclic redundancy check (CRC) value based upon the volume, a size of the data sector, a number of blocks in the volume, a name of the volume, and an indication of the amount of free space in the volume.

2. The machine accessible medium of claim 1, wherein:
   the nonvolatile memory is selected from a group consisting of a read only memory (ROM), a NAND flash memory, and a NOR flash memory;
   the entry includes an offset from a base address in the non-volatile memory to the data sector, and a size value associated with the data sector;
   the file header includes a size of the file, a hash value associated with the file, and a directory relationship identifier associated with the file; and
   the nonvolatile memory is organized into a plurality of blocks, and wherein the data sector is unaligned with a block of the plurality of blocks.

3. A method comprising:
   writing data of a file to a first number of data sectors in a non-volatile memory, the first number of data sectors being unaligned with and contiguously spanning a second number of blocks of the non-volatile memory, wherein the non-volatile memory is erasable at a block of the second number of blocks granularity;
   writing a first entry to a sector table in the non-volatile memory, the first entry to include a compression value to indicate a corresponding, compressed data sector of the first number of data sectors is compressed; and
   writing a second entry to the sector table, the second entry to include a compression value to indicate a corresponding, uncompressed data sector of the first number of data sectors is uncompressed,
   wherein writing of the data of the file, the first entry to the sector table, and the second entry to the sector table is in response to a write request to the corresponding uncompressed data sector, and
   writing a configuration header at both a beginning and an end of a volume to demarcate the volume from at least one other portion of a memory array, the memory array including the volume and the at least one other portion, the volume including the file and the sector table, the configuration header that is copied at both the beginning and the end of the volume permitting the presence and boundaries of the volume to be recognized by locating the configuration header that is copied at both the beginning and the end of the volume, the configuration header also permitting validation that information in the volume has been stored correctly, the configuration header including a cyclic redundancy check (CRC) value based upon the volume, a size of the data sectors, a number of blocks in the volume, a name of the volume, and an indication of the amount of free space in the volume.

4. The method of claim 3, wherein:
   the first number of data sectors is greater than the second number of blocks; and
   the method further comprises writing a reference for the sector table to a file header, the reference for the sector table being an offset from a base address in the non-volatile memory.

5. An apparatus comprising:
   logic to, in response to a request to update a data sector with data from a file the logic including at least one integrated circuit, update an entire volume associated with the file, the volume being comprised in a memory array that also includes at least one other portion that is outside the volume, wherein the updating the entire volume comprises:
   updating:
      a data sector including the data from the file;
      an uncompressed entry in a sector table, including a reference to the data sector and a compression field holding a first value in response to the data held in the data sector being compressed, and a second value in response to the data held in the data sector being uncompressed; and
      a file header including a reference to the sector table; and
   updating a configuration header that is copied at both a beginning and an end of the volume to demarcate the volume from the at least one other portion of the memory array, the configuration header that is copied at both the beginning and the end of the volume permitting the presence and boundaries of the volume to be recognized by locating the configuration header that is copied at both the beginning and the end of the volume, the configuration header also permitting validation that information in the volume has been stored correctly, the configuration header including a cyclic redundancy check (CRC) value based upon the volume, a size of the data sector, a number of blocks in the volume, a name of the volume, and an indication of the amount of free space in the volume.

6. The apparatus of claim 5, wherein:

the nonvolatile memory is selected from a group consisting of a read only memory (ROM), a NAND flash memory, and a NOR flash memory;

the entry includes an offset from a base address in the non-volatile memory to the data sector, and a size value associated with the data sector;

the file header includes a size of the file, a hash value associated with the file, and a directory relationship identifier associated with the file; and the nonvolatile memory is organized into a plurality of blocks, and wherein the data sector is unaligned with a block of the plurality of blocks.

* * * * *

UNITED STATES PATENT AND TRADEMARK OFFICE
CERTIFICATE OF CORRECTION

| | | |
|---|---|---|
| PATENT NO. | : 8,219,739 B2 | |
| APPLICATION NO. | : 11/479901 | |
| DATED | : July 10, 2012 | |
| INVENTOR(S) | : Kiran K. Bangalore et al. | |

It is certified that error appears in the above-identified patent and that said Letters Patent is hereby corrected as shown below:

Title page, Item (57), in column 2, in "Abstract", line 5, delete "included" and insert -- include --, therefor.

In column 14, line 43-44, in claim 5, after "from a" delete "file the logic including at least one integrated circuit," and insert -- file, --, therefor.

In column 14, line 44, in claim 5, after "file," insert -- the logic including at least one integrated circuit, --.

Signed and Sealed this
Eleventh Day of September, 2012

David J. Kappos
*Director of the United States Patent and Trademark Office*